Aug. 7, 1923.
K. N. SACHS ET AL
1,464,220
MEANS FOR CUSHIONING TRANSMISSION SHAFTS
Filed Dec. 27, 1921    2 Sheets-Sheet 1
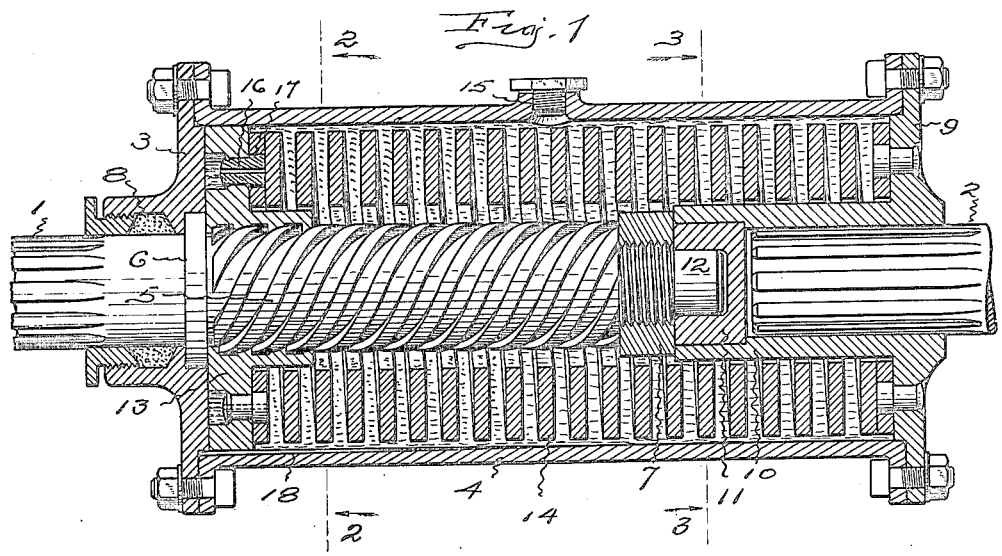
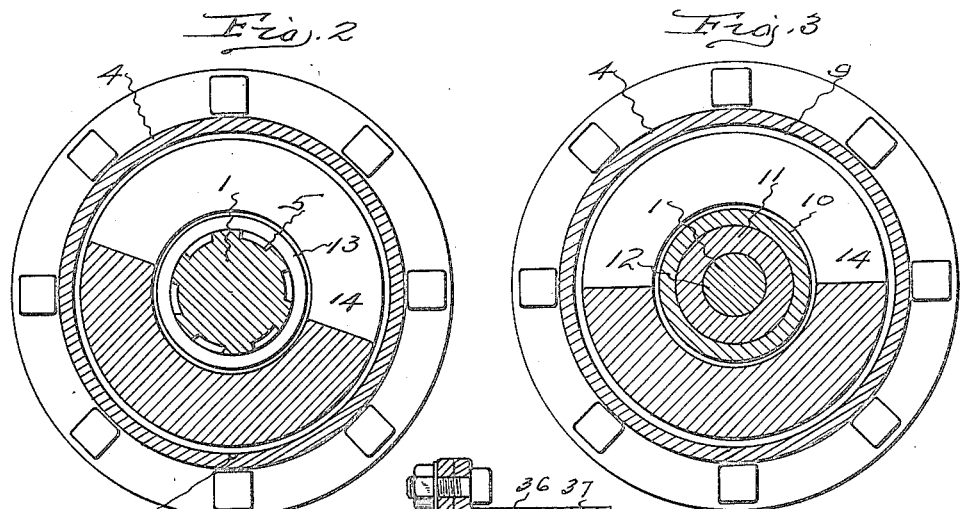
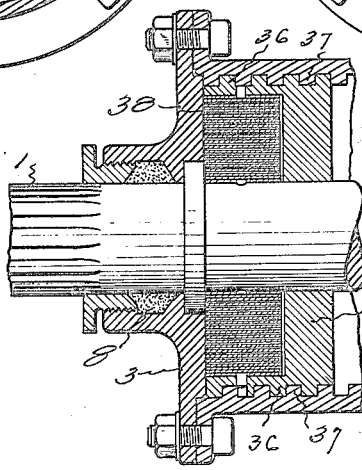
INVENTORS
Kelvin N. Sachs &
Joseph Sachs by
Harry P. Williams
ATTORNEY

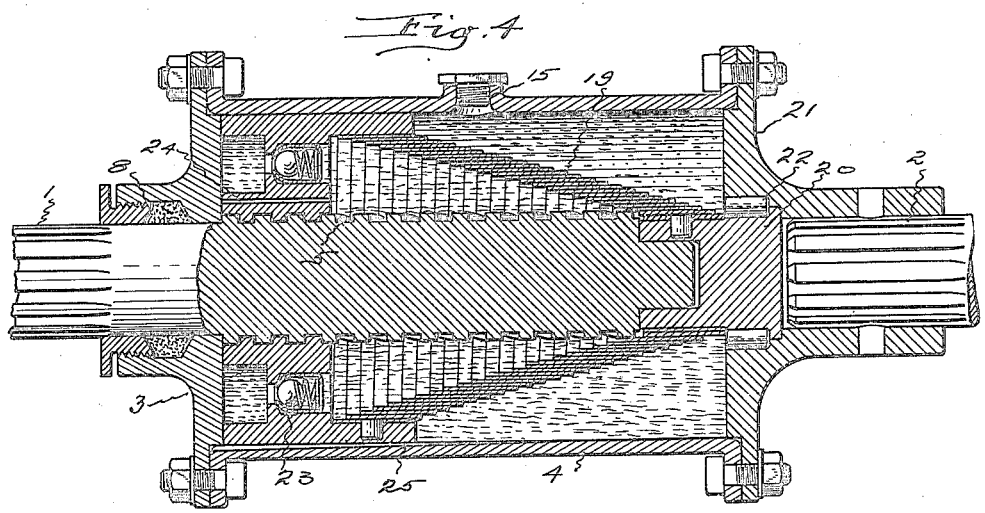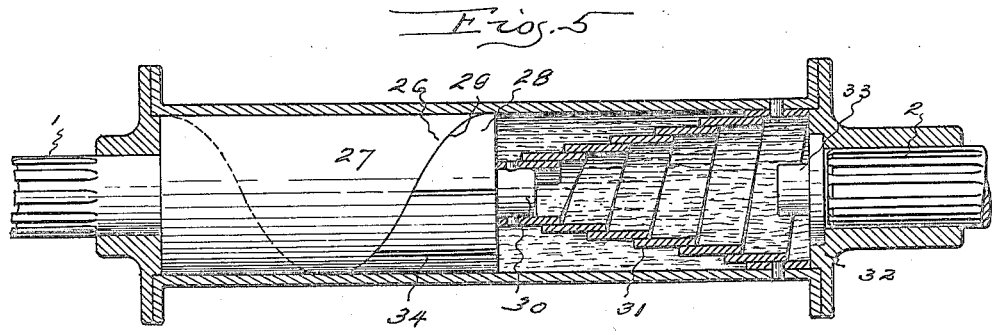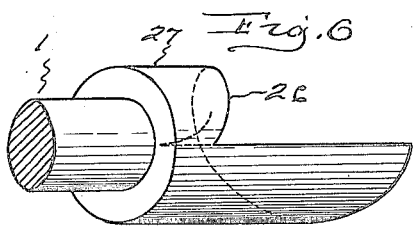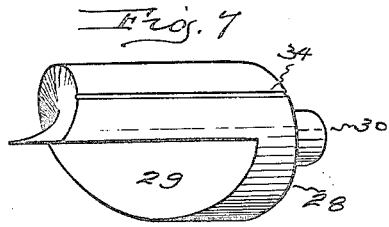

Patented Aug. 7, 1923.

1,464,220

UNITED STATES PATENT OFFICE.

KELVIN N. SACHS AND JOSEPH SACHS, OF HARTFORD, CONNECTICUT.

MEANS FOR CUSHIONING TRANSMISSION SHAFTS.

Application filed December 27, 1921. Serial No. 525,117.

*To all whom it may concern:*

Be it known that we, KELVIN N. SACHS and JOSEPH SACHS, citizens of the United States, residing at Hartford, in the county of Hartford and State of Connecticut, have invented a new and useful Improvement in Means for Cushioning Transmission Shafts, of which the following is a specification.

This invention relates to those devices which are designed to be inserted in power transmission systems between the power and the load for the purpose of eliminating undesirable shock and strain incident to the inertia of the parts or sudden variations in torque of power and load, as on starting a load from rest, or when running the load is suddenly increased or when the load tends to run ahead of the power.

The object of the invention is to provide a device of this character which is simple to construct and apply and which is strong, durable and efficient.

The constructions illustrated as embodying this invention are particularly adapted for insertion in the transmission systems of automotive vehicles, such as trucks and heavy duty automobiles and motor boats, but of course, they are capable of service in any power transmission lines where it is desirable to reduce or relieve the objectionable effects incident to variations of power with relation to load.

In the devices shown there is a driving member, a driven member and a yielding connection between these members that comprises a spring cushion and a fluid check, the spring by torsion and tension serving to cushion the parts and also restore the check to normal condition, and the check serving to sustain and prevent the violent action of the spring.

In the accompanying drawings Figure 1 shows a central longitudinal section of a device which embodies the invention. Fig. 2 is a transverse section on the plane indicated by the dotted line 2—2 on Fig. 1. Fig. 3 is a transverse section on the plane indicated by the dotted line 3—3 on Fig. 1. Fig. 4 shows a central longitudinal section of a modified form of the device. Fig. 5 is a similar section of another modification. Fig. 6 shows one of the check cams used in the form shown in Fig. 5. Fig. 7 shows the other of the check cams used in the form shown in Fig. 5. Fig. 8 is a view of one end of a device which embodies the invention having a slightly different construction, but producing the same result.

For the purpose of description 1 will be considered the driving shaft and 2 the driven shaft, but of course this condition could be reversed. The driving shaft extends with a rotatable fit through the head 3 of the cylinder 4. In the interior of the cylinder the driving shaft has a plural screw thread 5. At the outer end of the thread the driving shaft has a collar 6 bearing against the end of the cylinder and at the other end of the thread it has a nut 7. A gland packing 8 is arranged in the head about the driving shaft to prevent the leakage of fluid from the cylinder. The driven shaft extends through and is keyed, splined or otherwise rotatably fastened to the head 9 of the cylinder. This head has a hub 10 containing a hardened socket 11 in which the tip 12 of the driving shaft is journalled.

Closely but movably fitting the inner wall of the cylinder and also fitting upon the threaded part of the driving shaft is a piston 13. This piston is free to rotate and to move longitudinally in the cylinder. In the cylinder with one end fastened to the piston and the other end fastened to the head 9, is a spiral spring 14. The cylinder is filled with oil or other suitable fluid through the plugged opening 15, and communication may be provided for the restricted flow of fluid from one side of the piston to the other by small holes 16 through the studs 17 that fasten the end of the spring to the piston, or by forming one or more grooves 18 in the wall of the cylinder, which grooves desirably taper or decrease in cross sectional area from the end of the cylinder inward.

With this construction when power is applied to the driving shaft the load resistance on the driven shaft causes the piston to be turned in on the threaded section on the driving shaft against the elastic torsional and tensional forces of the spring and the body of fluid in the cylinder which has a small flow only through or past the piston, until the reaction of the spring and liquid is sufficient to overcome the inertia of the driven shaft and cause the latter to rotate. As the inertia resistance is overcome due to the picking up of the load, the torsional and tensional resilience of the spring co-act to return the piston, as permitted by the flow of fluid from one side to the other, until the balance of forces is restored and then the driving shaft rotates the driven shaft through the spring immersed in the liquid, as a single part. As the resistance of the load varies, either increasing or diminishing, with relation to the power, the position of the piston on the driving shaft is changed by the resilient action of the spring, which however is not violent owing to the retardation of the movement of the piston by the fluid. If the load should be heavy and sufficient to completely overcome the resistance of the spring the piston travels along the threaded section of the driving shaft until it reaches the nut 7, then the parts become locked together as one piece.

The spring may if desired be in the form of a conical helix 19 as shown in Fig. 4. In this case the piston, that is threaded upon the driving member, may be recessed for receiving the large end of the spring. The small end of the spring is in this arrangement fastened to a block 20 which is fitted in the head 21 of the cylinder and is held by studs 22 so that these parts will rotate together. If desired as shown in Fig. 4, check valves such as spring-controlled valves 23 may be arranged in ports in the piston so that when the piston is returned the valves will open and let the fluid flow more freely through the piston on the return movement than on the forward movement. The forward movement of the piston in this case is opposed by the tensional and torsional resilience of the coils of the spring and the rapidity of movement is determined by the flow of fluid through passages 24 in the piston or through grooves 25 in the wall of the cylinder. These grooves if used are desirably tapering, as were the grooves in the previously described form, so that the area of the passages will grow smaller and consequently the flow of the liquid will be more restricted as the piston moves forward against the pressure of the spring when the driving shaft is rotated and resistance is offered to rotation by the load on the driven shaft sufficient to overcome the normal tension of the spring.

Instead of connecting the piston with the driving member by means of plural screw threads, a single thread or spiral cam face 26 may be formed on the head 27 of the driving shaft as shown in Fig. 5. In this case the adjacent end of the piston 28 will have a complementary shaped single thread or spiral cam face 29. This piston is shown as having a stud 30 that is fastened to the small end of a conical spring 31, the large end of which is fastened to the cylinder near the head 32. A stop plug 33 is set in the inner wall of the head so that if the resistance of the load is sufficient to completely overcome the force of the spring, the stud 30 on the piston will abut against the stud 33 in the head before the cam surfaces become disengaged and drive the parts. In this form the rotation of the driving shaft causes its head to push the piston forward as fast as the fluid flows past the piston and until the reaction produced by the spring and liquid is equal to the inertia resistance of the driven shaft to the driving force of the driving shaft, at which time the piston will move no further forward but through the spring will rotate the driven shaft. When the relative resistance of the load decreases the spring forces the piston back as fast as the fluid flows past the piston. Grooves 34 may be formed in the periphery of the piston to permit the fluid to flow from one side to the other.

In the forms above described the driving force is transmitted from the driving shaft to the driven shaft, under normal conditions, through the spring, and the tension of the spring varies under the different relations of the load to the driving power, and in all cases the action of the spring, both when being compressed or returning the piston, is retarded and controlled by the rapidity of flow of the fluid past the piston which flow, desirably is slower when the piston moves inward and the load is increasing rather than when the piston is moving outward and the load offers less resistance to the driving force.

In the form shown in Fig. 8 the piston 35 is shown as having threads 36 on its outer edge fitting threads 37 cut in the inner wall of the cylinder so that the piston is free to move rotatably and longitudinally of the cylinder. A contractile spring 38 is arranged in front of the nut with one end fastened thereto and the other end fastened to the driving shaft. In this case as the piston is advanced the spring is drawn out against its torsional and tensional resistance, which forces are utilized to balance the difference between the inertia of the driving and the driven shafts.

In the organizations described the piston is shown as being free to rotate in the cylinder so as to take advantage of the torsional resistance as well as the tensional resistance of the springs. This action utilizes all of the resilient qualities of the springs and the springs by their torsional reaction easily return the pistons on the threads back to normal positions.

The invention claimed is:—

1. Means for cushioning a transmission shaft, comprising a cylinder, an internally threaded piston movable rotatably and longitudinally in the cylinder, a spring interposed between and having its ends fastened respectively to the cylinder and piston, a driving member and a driven member, one of said members being positively connected with the cylinder and the other member being loosely connected with the cylinder and having a screw thread adapted to engage and move the threaded piston in the cylinder against the force of the spring.

2. Means for cushioning a transmission shaft comprising a cylinder, a piston movable rotatably and longitudinally in the cylinder, a spring interposed between and having its ends fastened respectively to the cylinder and piston, a driving member and a driven member, one of said members being positively connected with the cylinder and the other member being loosely connected with the cylinder and bearing means adapted to engage and move the piston longitudinally and rotatably in the cylinder against the tensional and torsional forces of the spring, means for filling the cylinder with fluid, and means permitting a restricted flow of fluid from one side of the piston to the other.

3. Means for cushioning a transmission shaft comprising a cylinder, an internally threaded piston movable longitudinally and rotatably in the cylinder, a spring interposed between and having its ends fastened respectively to the cylinder and piston, a driving member and a driven member; one of said members being positively connected with the cylinder and the other member being loosely connected with the cylinder and having a screw thread adapted to engage and move the threaded piston both longitudinally and rotatably in the cylinder against the tensional and torsional forces of the spring, means for filling the cylinder with fluid, and a tapered groove in the wall of the cylinder for permitting a variable flow of fluid from one side of the piston to the other.

4. Means for cushioning a transmission shaft comprising a cylinder, a piston movable longitudinally and rotatably in the cylinder, a spring interposed between and having its ends fastened to the cylinder and piston, a driving member and a driven member, one of said members being positively connected with the cylinder and the other member being loosely connected with the cylinder and bearing means adapted to engage and move the piston longitudinally and rotatably in the cylinder against the tensional and torsional forces of the spring.

5. Means for cushioning a transmission shaft comprising a cylinder, a driving member connected with the cylinder, a driven member connected with the cylinder, a piston movable rotatably and longitudinally in the cylinder, said piston having a threaded connection with one of said members, and a spring connected to the piston and to the other of said members.

6. In a transmission cushion, two rotatory members, one of which is a driving and the other a driven member, a piston screw connected to one member and rotatively free from and adapted to be moved longitudinally with relation to the other member by the screw connection, and a spring connected to the piston and to the said other member.

7. In a transmission cushion, two rotatory members one of which is a driving and the other a driven member, a piston screw connected to one member and rotatively free from and adapted to be moved longitudinally with relation to the other member by the screw connection, a spring connected to the piston and to the said other member, and a cylinder containing fluid enclosing the piston.

KELVIN N. SACHS.
JOSEPH SACHS.